US010038999B2

(12) United States Patent
Sprigg et al.

(10) Patent No.: US 10,038,999 B2
(45) Date of Patent: Jul. 31, 2018

(54) TRIGGERING EVENT PROCESSING

(71) Applicant: QUALCOMM Incorporated, San Diego, CA (US)

(72) Inventors: Stephen A. Sprigg, Poway, CA (US); Brian Minear, Sunrise Beach, TX (US); Paul E. Jacobs, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 14/842,581

(22) Filed: Sep. 1, 2015

(65) Prior Publication Data
US 2015/0373536 A1 Dec. 24, 2015

Related U.S. Application Data

(63) Continuation of application No. 10/739,651, filed on Dec. 18, 2003.

(Continued)

(51) Int. Cl.
*G06F 15/16* (2006.01)
*H04W 8/24* (2009.01)
(Continued)

(52) U.S. Cl.
CPC ............. *H04W 8/245* (2013.01); *H04L 67/30* (2013.01); *H04L 67/34* (2013.01); *H04L 69/329* (2013.01); *H04L 67/303* (2013.01); *H04W 88/02* (2013.01)

(58) Field of Classification Search
CPC ....... H04L 67/30; H04L 67/34; H04L 69/329; H04W 8/245
(Continued)

(56) References Cited

U.S. PATENT DOCUMENTS 5,159,685 A 10/1992 Kung
5,754,857 A 5/1998 Gadol
(Continued)

FOREIGN PATENT DOCUMENTS

AU 2003274446 5/2004
JP 3085641 A 4/1991
(Continued)

OTHER PUBLICATIONS

International Search Report—PCT/US03/040925,International Search Authority—US, dated May 6, 2004.
(Continued)

*Primary Examiner* — Glenford Madamba
(74) *Attorney, Agent, or Firm* — Muncy, Geissler, Olds & Lowe, P.C.

(57) ABSTRACT

Systems, methods, and programs for processing extra data when a triggering event occurs. In one embodiment, an application, triggering event data, and extra data is stored on a wireless device. The wireless device monitors a triggering event parameter associated with an application, such as the expiration of the application. When the triggering event occurs, the wireless device processes the extra data in addition to processing associated with the triggering event data. The extra data may include URLs, scripts or other instructions that involve processing locally to the wireless device or requiring connection to a wireless network for remote processing on other devices.

28 Claims, 8 Drawing Sheets

Related U.S. Application Data

(60) Provisional application No. 60/435,085, filed on Dec. 19, 2002.

(51) Int. Cl.
   *H04L 29/08* (2006.01)
   *H04W 88/02* (2009.01)

(58) Field of Classification Search
   USPC .......................................................... 709/228
   See application file for complete search history.

(56) References Cited

U.S. PATENT DOCUMENTS

| | | | |
|---|---|---|---|
| 6,023,766 A | 2/2000 | Yamamura | |
| 6,219,694 B1 | 4/2001 | Lazaridis et al. | |
| 6,219,696 B1 * | 4/2001 | Wynblatt | G06Q 30/0267 |
| | | | 705/14.64 |
| 6,799,277 B2 | 9/2004 | Colvin | |
| 7,031,441 B1 | 4/2006 | Edwards et al. | |
| 7,069,444 B2 | 6/2006 | Lowensohn et al. | |
| 7,072,672 B1 | 7/2006 | Vanska et al. | |
| 7,275,243 B2 | 9/2007 | Gibbons et al. | |
| 2002/0013777 A1 | 1/2002 | Diener | |
| 2002/0037722 A1 | 3/2002 | Hussain et al. | |
| 2002/0052194 A1 | 5/2002 | Sivakumar | |
| 2002/0113992 A1 * | 8/2002 | Takakura | G06Q 30/02 |
| | | | 358/1.15 |
| 2002/0120579 A1 | 8/2002 | Kawaguchi et al. | |
| 2002/0123336 A1 * | 9/2002 | Kamada | G06Q 30/0601 |
| | | | 455/420 |
| 2002/0129129 A1 | 9/2002 | Bloch et al. | |
| 2002/0129353 A1 | 9/2002 | Williams et al. | |
| 2002/0169776 A1 | 11/2002 | Tuunanen et al. | |
| 2003/0037021 A1 | 2/2003 | Krothappalli et al. | |
| 2003/0051047 A1 | 3/2003 | Horel et al. | |
| 2003/0105825 A1 | 6/2003 | Kring et al. | |
| 2003/0105926 A1 | 6/2003 | Rodriguez | |
| 2004/0205151 A1 | 10/2004 | Sprigg et al. | |

FOREIGN PATENT DOCUMENTS

| | | |
|---|---|---|
| JP | 9265408 A | 10/1997 |
| JP | 10187466 A | 7/1998 |
| JP | 2002245226 A | 8/2002 |
| JP | 2002259606 A | 9/2002 |
| JP | 2002278773 A | 9/2002 |
| RU | 2128362 | 3/1999 |
| RU | 2210803 | 8/2003 |
| WO | 92015940 | 9/1992 |
| WO | 9741654 A1 | 11/1997 |
| WO | 98026349 | 6/1998 |
| WO | 02057940 A1 | 7/2002 |
| WO | 02096025 A1 | 11/2002 |

OTHER PUBLICATIONS

Supplementary European Search Report—EP03797066, Search Authority—Munich, dated Oct. 31, 2008.

Taiwan Search Report—TW092136160—TIPO—dated May 2, 2014.

* cited by examiner

TRIGGERING EVENT PROCESSING

CROSS-REFERENCE TO RELATED APPLICATIONS

The present application for patent claims priority to U.S. Non-Provisional application Ser. No. 10/739,651, entitled "Triggering Event Processing", filed on Dec. 18, 2003, which in turn claims priority to U.S. Provisional Application No. 60/435,085 entitled "Triggering Event Processing", filed Dec. 19, 2002, each of which is assigned to the assignee hereof and hereby expressly incorporated by reference herein in its entirety.

BACKGROUND

I. Field of the Invention

The present invention generally relates to computer networks and communications across computer networks. More particularly, the invention relates to the initiation or continuation of processing based on a triggering event associated with an application or data on the wireless device.

II. Description of the Related Art

Wireless devices are being developed that allow for the execution of applications on these wireless devices. In addition, systems are being developed that allow the downloading of these applications, including data and other content, onto the wireless device using a wireless network. The ability to download applications onto a wireless device provides several advantages. One advantage includes the ability of a user to tailor their wireless device with the applications they want. Another advantage includes not requiring the wireless device manufacturer to load all the applications that may be wanted by the user prior to shipment. In addition, the carrier, whose network will be used by the wireless device, is not required to determine which applications the user will want to use prior to selling the wireless device for use on the network. The carrier can also dynamically determine which applications they will allow to execute on their network.

Carriers, in addition to allowing applications to execute on their network, also provide other features to users of the network. Features include additional functions and/or services associated with the wireless device. Such features may include access to special data transmission rates, caller identification and voice mail, access to GPS, MPEG or other functions supported by the wireless device.

Typically, the features available to a user of a wireless device are defined to the phone prior to receipt by the user. This is done in advance because, depending on the feature, the phone may require sophisticated instructions to activate the feature on the handset. Furthermore, the handset may not have an application that requires the feature and, therefore, the activation is not necessary. Some features require that the server associated with the carrier providing service to the wireless device update information allowing this feature to be used by the phone. For example, if the user wants a voice mail feature, a carrier server will be configured so that the wireless device has access to voice mail.

Currently, users who wish to include these features, or execute applications that will require access to these features, can only add these features using few methods. One method is having the features activated when the wireless device is purchased. This is sometimes, however, difficult for the user to anticipate all the features they may want. As described above, the user will be able to tailor their wireless devices with new applications as they become available. It will not necessarily be known by the user that an application available in the future uses a feature that they should have activated.

In addition, it is foreseeable that a user may only want a feature for a short period of time, such as during the time they intend to use an application that takes advantage of the feature or to use on a trial basis to see if they like the feature. This user would not want to have the manufacturer install or activate this feature if they only want to use for a short time.

Another method is to have the user contact a carrier operator. This is a can be a cumbersome process where the user must call the carrier. The carrier is verbally instructed what feature the user wants. The carrier configures the server associated with that user to indicate the feature is active. The carrier also then verbally instructs the user to perform a sequence of complicated commands to activate the feature on the wireless device. This creates many problems. Not only is it cumbersome and complex for the user, it inhibits the user's desire to add features to the phone, thus limiting the carrier's ability to provide additional features to a current user.

Consequently, what is needed in the art are systems and methods to allow features be made accessible to phone in a dynamic nature so that the user may add features without cumbersome instructions. Furthermore, such systems and methods would provide a period of expiration to disable or remove the features.

SUMMARY OF THE INVENTION

The present invention is a system, method, and computer program for activating features associated with a wireless device. In one embodiment, a system for activating a feature for a wireless device includes a wireless device configured to receive a request to activate a feature associated with the wireless device, to configure the wireless device to access the feature, and to send a message to a server at activate the feature, and the server configured to receive a message to activate a feature associated with the wireless device and to modify the information files associated with the wireless device associated with activating the feature.

In another embodiment, a method for activating a feature on a wireless device includes receiving a request to activate the feature, requesting a component from a download server, receiving the component at the wireless device, and executing the component on the wireless device, wherein the component comprising configuring the wireless device so that the feature is activated, sending a message to a profile server to configure the feature on the profile server.

BRIEF DESCRIPTION OF THE DRAWINGS

Objects, advantages, and features of the present invention will become apparent after review of the hereinafter set forth Brief Description of the Drawings, Detailed Description of the Invention, and the Claims.

DETAILED DESCRIPTION OF THE INVENTION

Figure 1:
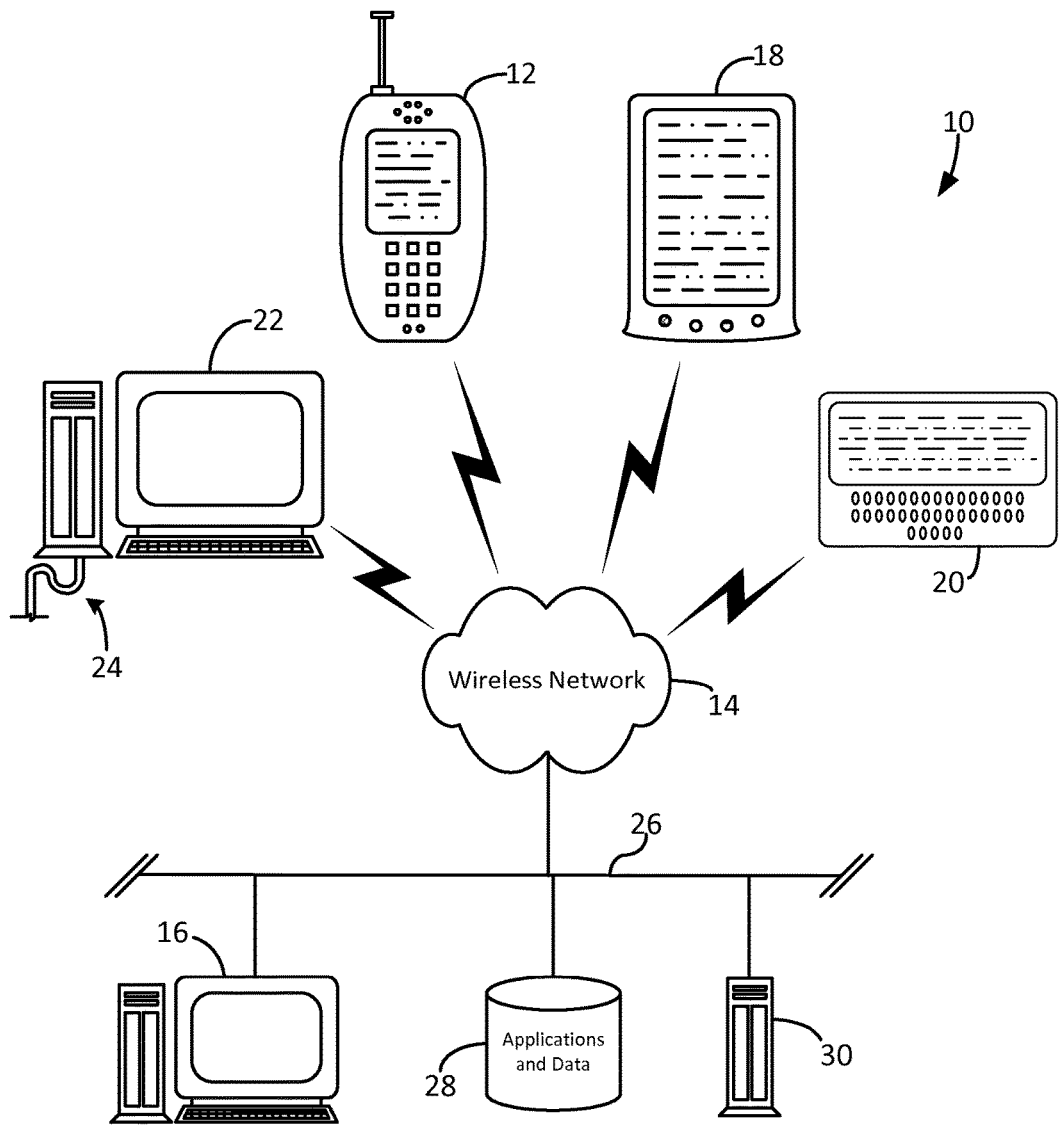
FIG. 1 is a diagram depicting a wireless network and with several computer devices that communicate with each other across the network.

With reference to the figures in which like numerals represent like elements throughout, FIG. 1 illustrates an embodiment of a system 10 for providing subscribed software applications to one or more wireless devices, such as cellular telephone 12, in communication across a wireless network 14 with at least one network server, such as application download server 16, that selectively downloads or provided access to software applications or other data to the wireless devices across a wireless communication portal or other data access to the wireless network 14. As shown here, the wireless device can be a cellular telephone 12, a personal digital assistant 18, a pager 20, which is shown here as a two-way text pager, or even a separate computer platform 22 that has a wireless communication portal, and may otherwise have a wired connection 24 to a network or the Internet. The system 10 can thus be performed on any form of remote computer module including a wireless communication portal, including without limitation, wireless modems, PCMCIA cards, access terminals, personal computers, access terminals, telephones without a display or keypad, or any combination or sub-combination thereof.

The application download server 16 is shown here on a local server-side network 26 with other computer elements in communication with the wireless network 14, such as a database 28 with stored applications and data that contains software applications and data that are accessible and downloadable to the wireless devices 12,18,20,22. There is also shown other network servers, such as server 30 and stand-alone network server 32. The server 30 and 32 can be application or data download servers, or other types of servers that interact with the wireless devices 12,18,20,22 as are known in the art. The servers 16,30,32 may have software applications, patches, files, keys, graphics data, compression algorithms, and any type of general data, collectively referred to hereinafter as "datasets," resident thereupon that can be accessed by the wireless devices 12,18,20,22 as is further described herein. It should be noted that server-side functions as described herein can be performed on one server, such as application download server 16. Further, a computer server-side computer platform can provide separate services and processes to the wireless devices 12,18,20,22 across the wireless network 14.

Figure 2:
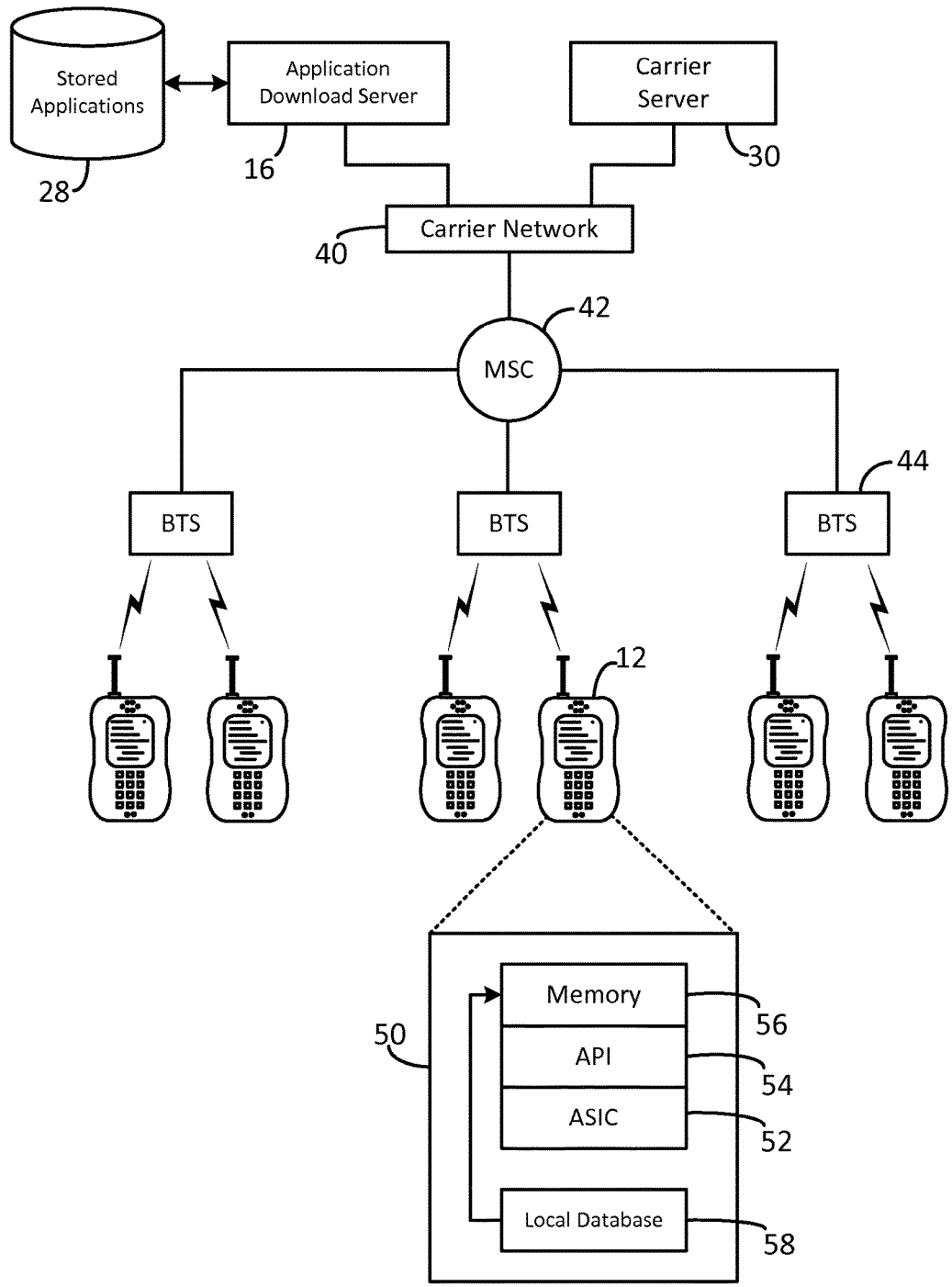
FIG. 2 is a block diagram of the hardware components of the wireless network providing communication between different wireless devices, an application download server, a carrier network server having a user profile database associated with wireless devices.

FIG. 2 is a block diagram that more fully illustrates the components of a wireless network 14 and interrelation of the elements of an exemplary embodiment. The wireless network 14 is merely exemplary and can include any system whereby remote modules, such as wireless devices 12,18, 20,22, communicate over-the-air between and among each other and/or between and among components of a wireless network 14, including, without limitation, wireless network carriers and/or servers. The application download server 16 and the stored applications database 28, other server 30, will be present on the cellular data network with any other components that are needed to provide cellular telecommunication services. The application download server 16, and/or other server 30 communicate with a carrier network 40, through a data link, such as the Internet, a secure LAN, WAN, or other network. The carrier network 40 controls messages (generally being data packets) sent to a messaging service controller ("MSC") 42. The carrier network 40 communicates with the MSC 42 by a network, the Internet, and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

Each wireless device, such as cellular telephone 12, has a computer platform 50 that can receive and execute software applications and display data transmitted from the application download server 16 or other network servers, such as the carrier server 30. The computer platform 50 also includes an application-specific integrated circuit ("ASIC") 52, or other processor, microprocessor, logic circuit, or other data processing device. The ASIC 52 is installed at the time of manufacture of the wireless device and is not normally upgradeable. The ASIC 52 or other processor executes the application programming interface ("API") layer 54 that interfaces with any resident programs in the memory 56 of the wireless device. The memory can be comprised of read-only or random-access memory (RAM and ROM), EPROM, EEPROM, flash cards, or any memory common to computer platforms. The computer platform 50 also includes a local database 58 that can hold the software applications, files, and/or data initially loaded onto the wireless device 12 by the manufacturer or downloaded from the application download server 16. The local database 58 is typically comprised of one or more flash memory cells, but can be any secondary or tertiary storage device as known in the art, such as magnetic media, EPROM, EEPROM, optical media, tape, or soft or hard disk.

Figure 3:
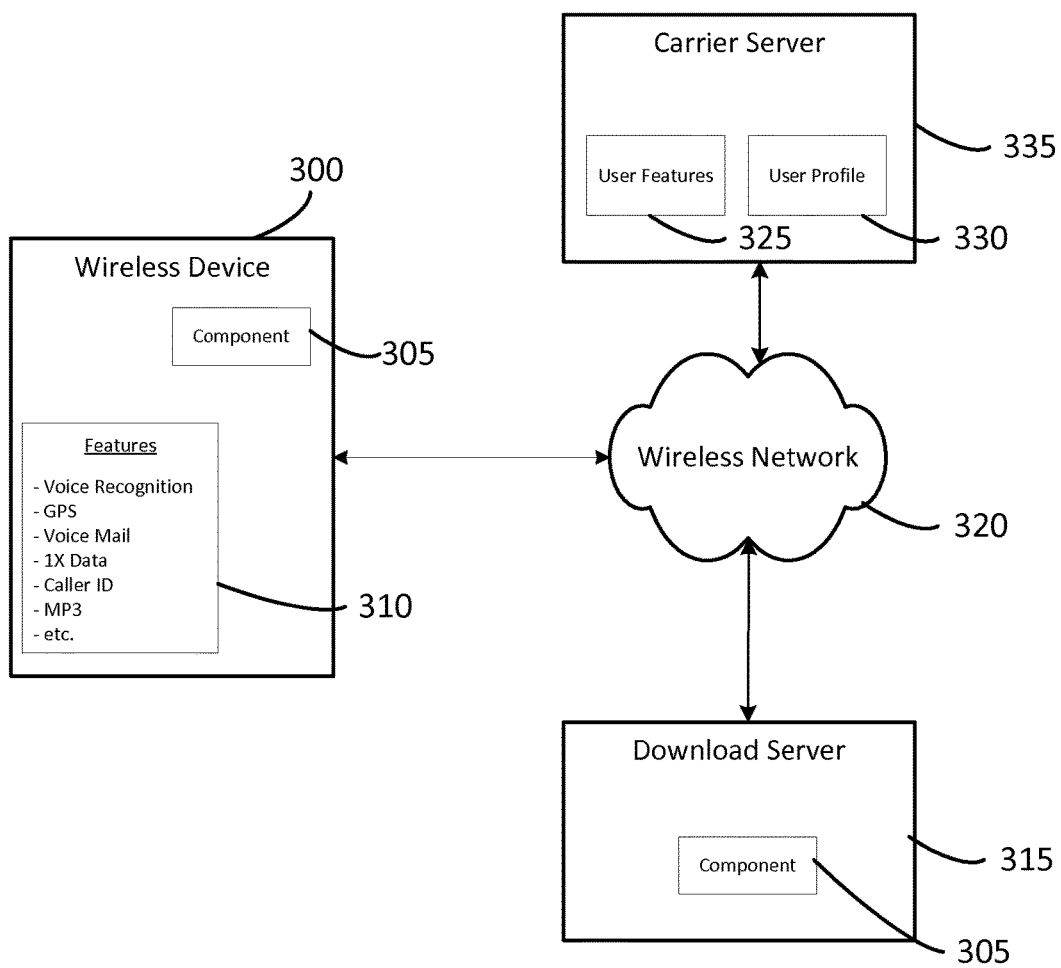
FIG. 3 depicts a component architecture of a system for activating a feature on a wireless device in an exemplary embodiment of the present invention.

FIG. 3 depicts a component architecture of a system for activating a feature on a wireless device in an exemplary embodiment of the present invention. The wireless device 300 may be manufactured and/or on a network that can potentially give it access to many features 310, including, but not limited to, voice recognition, GPS, voice mail, CDMA2000 1× data rates, caller ID, MP3 and others. Some of these features are activated on the wireless device itself, such as access to GPS, while others may require the use of a carrier server to activate the feature. For example, a user of a wireless device 300 may want voice mail associated with it, but the voice mail storage may be stored on the carrier's server. In either case, it may be desirable to inform the carrier server that a given feature is activated. While the wireless device 300 may have the potential to access these many features 310, they may not all be activated on the wireless device 300. For example, even though the wireless device may have a GPS feature built into the processing chip, it may not be activated because the user chose not to pay for the functionality, the carrier chose not to support it, and/or applications were not developed at the time the wireless device 300 was manufactured that took advantage of the feature, as well as other reasons.

In an exemplary embodiment, a component 305 is stored on the download server 315. The download server may provide other applications accessible to the wireless device 300, such as applications or other content data. The wireless device 300 activates a feature 310 by requesting the component 305 from the download server. The component 305 is received by and stored in the wireless device 300. The wireless device then executes the component 305.

The component 305 contains the software logic to configure the wireless device so that the requested feature may be activated. Configuring the wireless device may include setting parameters, updating access tables or otherwise indicating to the wireless device or the platform on the wireless device that the feature may be accessed by the wireless device. The component may also contain other information, such as expiration data for when the feature is to be deactivated, as well as other licensing terms or other data that is useful in processing related to the activation of the feature.

The component 305 may also send a message to a carrier server 335, such as indicating that the feature being activated on the wireless device or requesting activation of the feature in the case where the carrier server 335 must also be configured. The carrier server 335 receives the message sent by the component and updates a profile associated with the wireless device indicating that the feature is activated. Updating the profile provides the carrier with knowledge that that feature is activated. This is useful so the carrier can account for which wireless devices are using what features. This is also useful for billing and performing tests or diagnostics. The carrier server 305 may also use the message retrieved from the component to configure its server to activate the feature requested by the wireless device. As stated above, some features may require a carrier server to be configured, such as voice mail. In the case where the activation requires additional actions by the carrier server other than just updating of profile for billing or other diagnostics, the carrier server will use the message and perform the necessary functions to configure the carrier server so that the user may access the feature requested.

Figure 4:
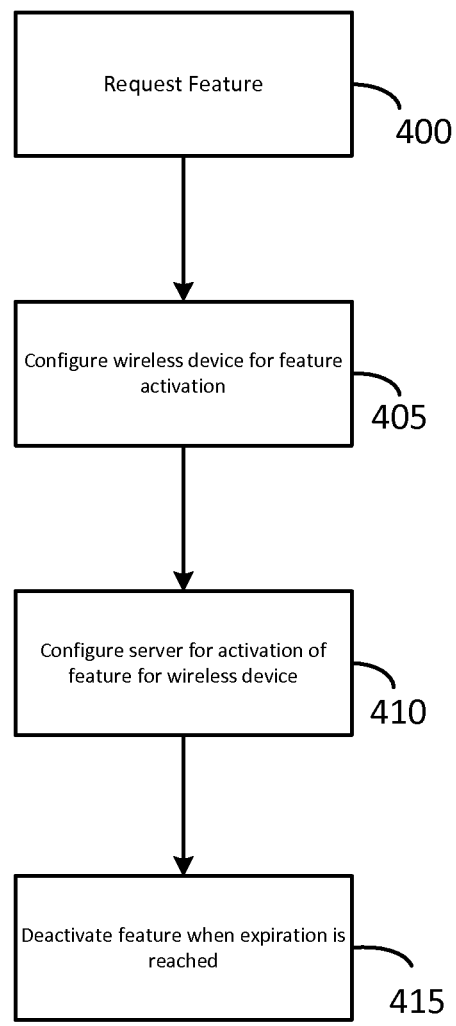
FIG. 4 is a flowchart depicting the high-level steps associated with activating a feature for a wireless device in an exemplary embodiment of the present invention.

FIG. 4 is a flowchart depicting the high-level steps associated with activating a feature for a wireless device in an exemplary embodiment of the present invention. The feature is requested on the wireless device (Step 400). This request may be performed by the user wanting additional services or functions associated with the wireless device. Alternatively, the request may be initiated by an application needing the feature in order to execute properly. For example, if a user of a wireless device wishes to execute a mapping program but the GPS feature is not activated on a wireless device. When the user executes the mapping application, the mapping application, or the platform on which the mapping application is being executed, may determine that the GPS feature does not exist and then initiate the request to activate the GPS function. In another alternative, a server may request that a feature be activated for a wireless device. Such features may be useful to the carrier in performing diagnostics or network optimization. The user of the wireless device may not be aware that such features are being activated.

Next, the feature is activated for the wireless device (Step 405). Activating a feature for the wireless device may take multiple configuration steps, such as may be configured to indicate to the applications and other tasks accessing the wireless device that this feature is now available. Furthermore, the steps required to configure a wireless device so that a feature is activated will vary based on several factors specific to the wireless device, including the type of hardware, including processors, used by the wireless device, the mechanisms used by the controlling software or wireless device platform that expose the feature to the wireless device. Similarly, the steps used to configure a carrier server to activate a feature or update a profile will vary based on the individual characteristics of the carrier server. The steps necessary to activate a feature for a specific wireless device or carrier server, as well as updating the profile on the carrier server, will be recognized by those skilled in the art.

In one embodiment, the wireless device contains a platform that interfaces between the applications and data on the wireless device and the wireless device hardware. Such a platform, for example, the BREW™ platform developed by QUALCOMM®, Inc. headquartered in San Diego, Calif., was briefly described in FIG. 2. Activating the feature on the device in one embodiment includes indicating to the platform that this feature has been requested and the platform initiating the availability of that feature on the wireless device. This can be performed by having a feature table and an indication in the table that the feature is now accessible. As described above, it will be recognized by those skilled in the art that there will be many variables and methods used to indicate and configure a wireless device for the given feature.

After configuring the wireless device in Step 405, a server is configured to activate the feature for the wireless device (Step 410). Some features as described above may use a server. For example, the use of voice mail or call waiting may require the need of a separate server to be used. The server is configured to indicate that this feature being requested be activated for the specific wireless device.

In addition, the server may be required to indicate in the profile that this feature is being activated for the wireless device. This may be the case even if the server is not being used for the feature. For example, if a feature is activated for a wireless device that only uses the wireless device resources, such as an MP3 feature or a GPS feature, the server may be notified of this so that it can track that the wireless device has this capability and can bill for this added feature. The server may provide additional access to functions of the network that are not accessible by the wireless device until the wireless device is configured to do so. For example, in a CDMA network, if the wireless device contains a CDMA2000 1× chip, but is not configured to transmit data at 1× data rates, the server will be configured to allow the wireless device to transmit 1× data rates.

The feature is then deactivated when an expiration is reached (Step 415). When a feature is requested by the wireless device, expiration parameters may be associated with the feature. For example, if the user is activating voice mail, the user may purchase the use of voice mail for three months. This expiration parameter may be associated with the activation of this feature so that the operating system, platform, or other monitoring application on the wireless device determine if the feature has expired and therefore be deactivated. In addition, the expiration parameter may be stored on the wireless device and/or on a server associated with the wireless device, and the request to deactivate based on expiration may be received from a server. Other methods, in addition to expiration described above, for deactivating the feature include initiating deactivation from a server or from the user requesting deactivation of the feature.

Figure 5:
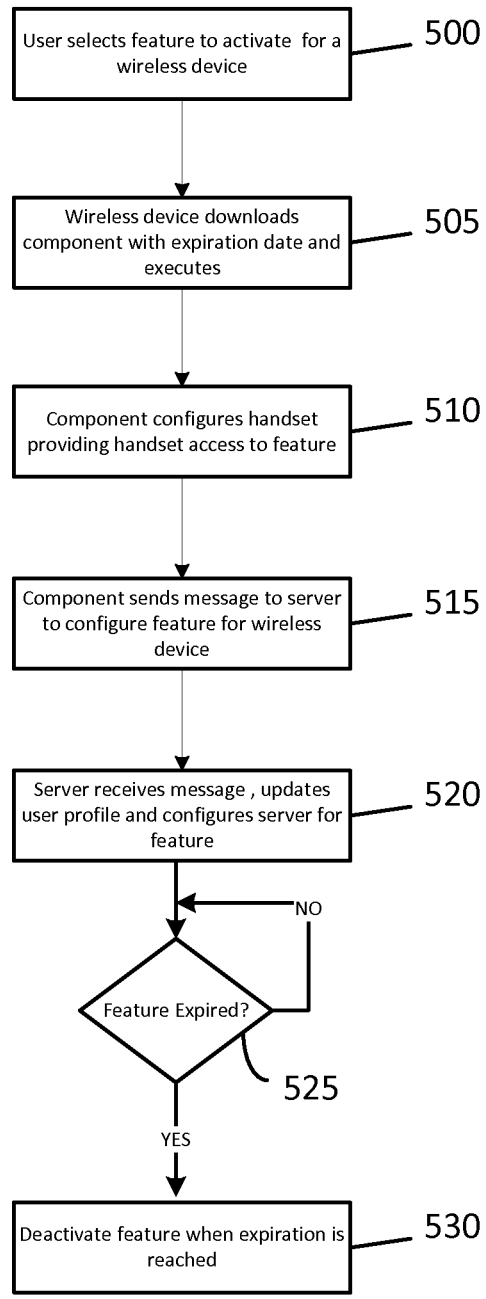
FIG. 5 is a flowchart depicting the steps to activate a feature on a wireless device in an exemplary embodiment of the present invention.

FIG. 5 is a flowchart depicting the steps to activate a feature on a wireless device in an exemplary embodiment of the present invention. The user selects a feature to activate for the wireless device (Step 500). As described above, a wireless device may have several features capable of being accessed but may be deactivated for various reasons such as the user not having purchased or activated these features at the time of receiving the wireless device. In one embodiment, the user may be presented with a menu on the wireless device which depicts a list of features that the wireless device can access and activate for its use. In addition, the applications that the wireless device may execute, whether already contained on the wireless device or otherwise downloaded to the wireless device, may require use of features that are not currently activated on the wireless device. In this case, the application may request the feature be activated.

In one embodiment, the user selects from a list of features associated with the wireless device to activate it. The user may also be given the option to select a time period for which this feature is activated (e.g., an expiration period). It is also within the scope of this invention that the user may also be presented with other licensing terms or parameters associated with the feature to accept or decline prior to activating the feature.

The wireless device downloads the component with the expiration date and executes the component (Step 505). In one embodiment, this component contains the configuring logic for the wireless device, and the expiration date associated with the feature and selected by the user. In addition, the component contains an indication of what to send a server associated with the wireless device to activate the feature.

Next, the component configures the handset and provides the handset access to the feature (Step 510). The component then sends a message to the server configuring the feature for the wireless device (Step 515). The server may use the receipt of this message to initiate the configuration steps necessary to activate this feature for the wireless device and/or update any profiles so that the appropriate billing or other desired functions may be performed (Step 520). The feature's expiration date is periodically checked to determine if it has expired (Step 525). This check may be performed by the component that was downloaded and installed on the wireless device, by the server, or other applications associated with the wireless device. If the feature has not expired, the feature will continue to be accessible by the wireless device. In the event that the feature has expired, then processing proceeds to deactivate the feature (Step 530). After deactivating the feature, the component may be removed from the wireless device so as to free up memory storage for other programs.

Figure 6:
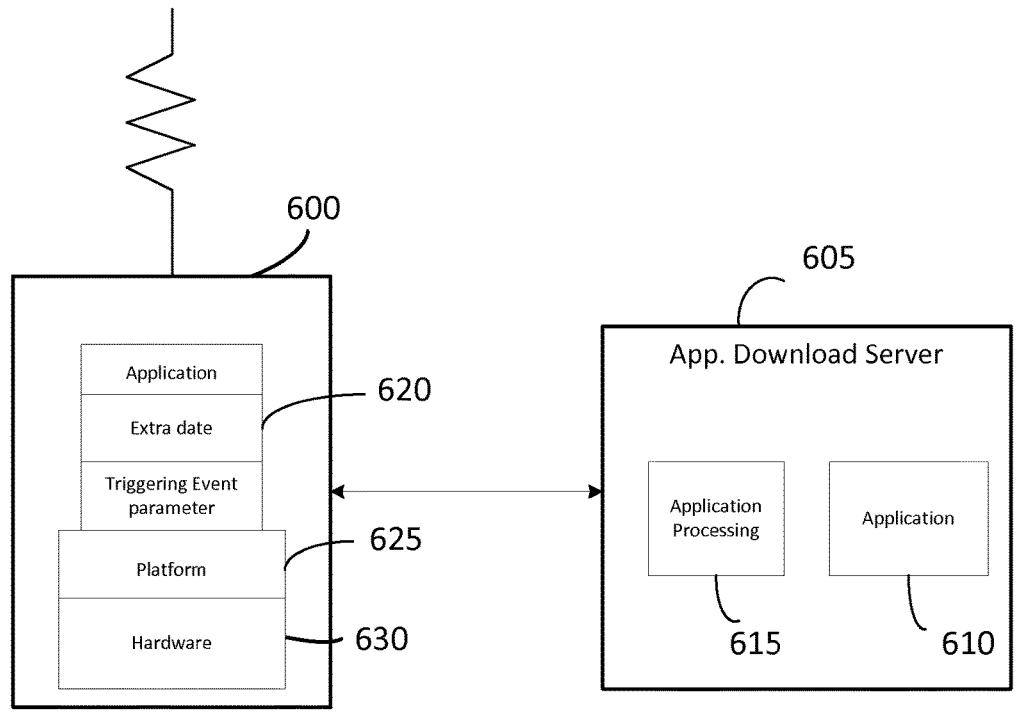
FIG. 6 is a block diagram of a system depicting the elements in processing a triggering event associated with an application on a wireless device in an exemplary embodiment of the present invention.

FIG. 6 is a block diagram of a system depicting the elements in processing a triggering event associated with an application on a wireless device in an exemplary embodiment of the present invention. In one embodiment, the system includes an application download server 605 having at least one application 610. Note that while "application" is used in this description, the present invention may be used with other information, such as content, or other data that can have a triggering parameter associated with it.

In one embodiment, the wireless device 600 requests to download the application 610 from the application download server 605. The application download server may process the application for the wireless device. For example, the user of the wireless device 600 may request the application be downloaded with the condition that the application will expire. An expiration date, or other expiration parameter may be associated with the application 610. It will be recognized by those skilled in the art that triggering events, other than an expiration, may be associated with information in implementing the present invention.

The application download server 605, may also include extra data associated with the application. This extra data, such as a URL, may contain scripts or other data that the wireless device can use for additional processing when the triggering event occurred. It will be recognized by those skilled in the art that the triggering event, and extra data need not bound to the application by the application download server 605 but can be received by the wireless device through other systems or mechanisms or can be associated together at the wireless device.

The wireless device 600 contains the information, triggering event parameter and extra data. Or as depicted in FIG. 6, the application has the extra data, and triggering event, such as an expiration date, associated with the application. The wireless device may have a platform, such as the BREW™ platform developed by QUALCOMM Incorporated, headquartered in San Diego Calif., which may be used to monitor the execution and/or the triggering event parameter. It will be recognized that other monitoring programs or paradigms may be used to monitor for the triggering event.

The platform 625 may be used to interface between the hardware 630 on the wireless device and the application and other data associated with the application (collectively 620). In one embodiment, the platform monitors the triggering event parameter and initiates the triggering event processing based on the parameter. For example, if the triggering event parameter is an expiration date, the platform checks the date in the system against the expiration date parameter and determines if the application has expired. If the application has expired the platform begins the processing described herein.

Figure 7:
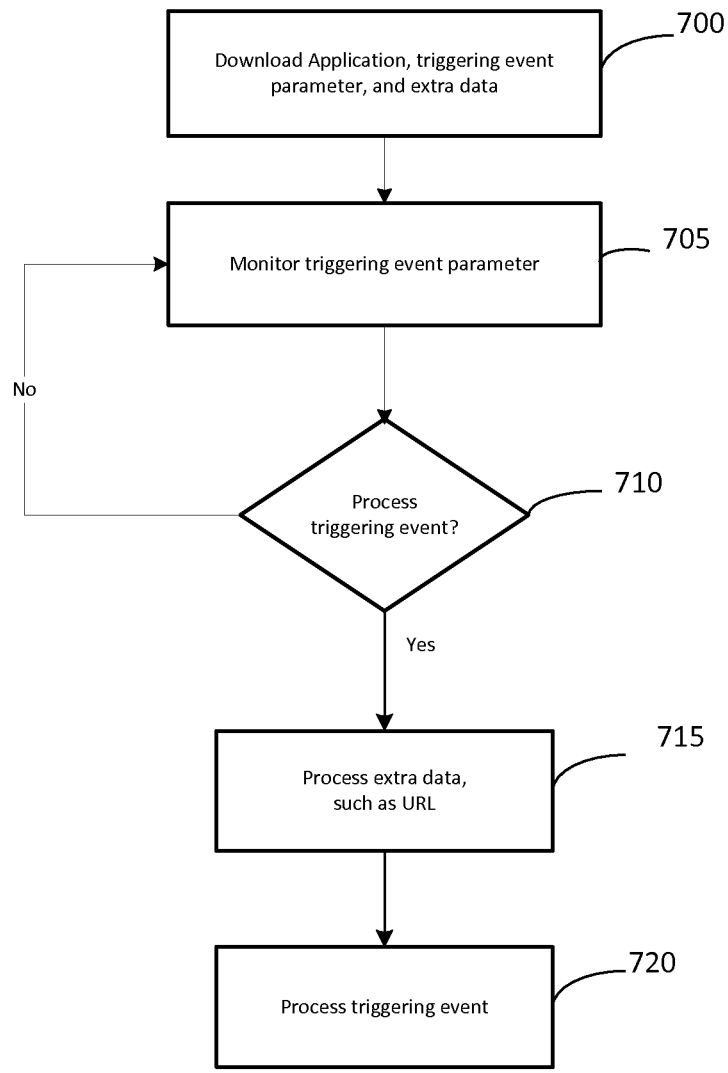
FIG. 7 is a flowchart depicting the high level steps associated with processing a triggering event in a wireless device in an exemplary embodiment of the present invention.

FIG. 7 is a flowchart depicting the high level steps associated with processing a triggering event in a wireless device in an exemplary embodiment of the present invention. The method begins with downloading the application (or other information), the triggering event parameter, and extra data (Step 700). As described above, any information that can have a triggering event parameter associated with it may be used, not just an application.

The process continues to monitor the triggering event parameter (Step 705). The triggering event parameter is any function, value or piece of data that can be evaluated to determine if a triggering event occurred. It may be date or time related. It may also be number of uses, or accesses associated with the information, for example. Furthermore, the triggering event parameter may have no direct relation to the underlying information it is associated with. For example, the triggering event may be to evaluate when another application executes, and when it does, start the termination of a different application.

When the evaluation of the triggering event parameter indicates that the triggering event should be processed (Step 710), the "Yes" branch is followed and the extra data, such as a Uniform Resource Locator (URL) associated with the application is processed (Step 715) The extra data may contain a script, instructions, a pointer to instructions, or some data that may be processed. In one embodiment, the URL contains a script that directs the a wireless device to process some functions either locally, i.e., within the wireless device, and/or remotely, involving, in part or in total, other systems outside the wireless device.

After the extra data is processed, the triggering event is processed (step 720). In this manner, additional processing associated with the triggering event may be associated with an application without having to alter the triggering event processing. When the trigger event occurs, the extra data is processed in addition to the triggering event.

Figure 8:
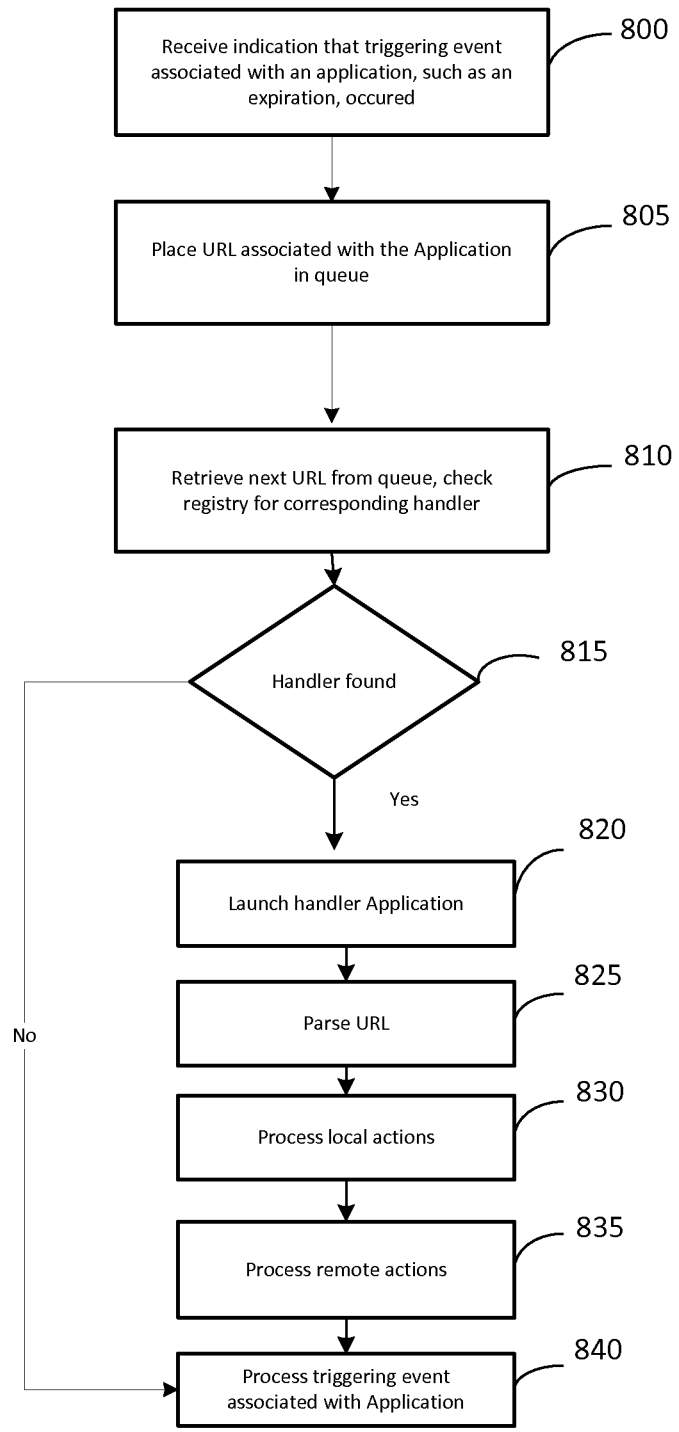
FIG. 8 is a flowchart depicting the processing associated with an application expiration triggering event and processing a URL upon the trigger of the expiration in an exemplary embodiment of the present invention.

FIG. 8 is a flowchart depicting the processing associated with an application expiration triggering event and processing a URL upon the trigger of the expiration in an exemplary embodiment of the present invention. The method receives an indication that the triggering event associated with an application, such as an expiration, occurred (Step 800). Prior to processing the expiration, extra data, such as a URL also associated with the application is placed in a queue (Step 805). Because the extra data may involve remote tasks, one advantage of placing it in a queue is that if the extra data requires connection to a network to perform the tasks, such as send instructions or data to a remote system, the processing of the extra data will not be lost of the wireless device processing the extra data does not have coverage (i.e., not connected to the network). Therefore, when the wireless device has coverage, it can retrieve the extra data from the queue and process the extra data.

The URL is retrieved from the queue and the wireless device's registry is checked to see if it has the corresponding handler (Step 810). It will be recognized by those skilled in the art that the URL may be formatted in a manner such that it can be determined to have a specific handler or be processed in a specific manner, such have different MIME types. If the handler is found (Step 815), then it is launched (Step 820). The handler then parses the URL (Step 825). Based on the results of parsing the URL, the handler, or other process, processes local actions (Step 830) and/or processes remote actions (Step 835). Following the processing associated with parsing the URL, the process proceeds to Step 840 where the triggering event associated with the application, such as the application's expiration, is processed (Step 840). Note that if no extra data was associated with the application, this above process would continue to process the triggering event. In this manner, systems implementing these embodiments, can devise one triggering event processing and modify the actions that take place when the triggering event occurs for specific information using the extra data.

Note that if the handler was not found in Step 815, the "No" branch is followed and the process proceeds to process the triggering event.

Other embodiments include,
1. As Part of the download process, a URL (or set of URLs) is passed along with the application data;
2. The URL is one or more "expiration actions" that are to be taken when the application expires (i.e., the license to use the application expires)
3. As the URLs are generic, they can be mapped to any action supported anywhere in the system. This includes those actions that control the automated download process, etc. The URL may also simply map to a web location;
4. The application is executed as normal;
5. When the app. expires, the expiration action URL(s) are placed into a queue of pending "expiration actions" that the wireless device is processing.

One benefit is that the behavior of expiration becomes "scripted". An example of actions that may be performed when the app. expires includes: The user is presented with a survey to complete about the application; the user is prompted to purchase the "real" version after they try the demo (i.e., the demo being the application that expired); the application is automatically removed from the wireless device; the application is disabled; a completely different application is downloaded. These only name a few as it is clear to those skilled in the art that any processing capable of being performed by or initiated by the wireless device may be performed.

In one embodiment, the following depicts the steps associated with processing the triggering event:
the application is downloaded; "Expiration URLs" are saved as part of the extra application data (e.g., inside the application); the application executes as normal until it expires (e.g., until it runs out of uses that were previously defined, expires by date, expires by time used, etc.); upon expiration, the "expiration URLs" are placed into a queue. The queue is normally processed immediately but may need to be processed later (if no data coverage, etc.); when a queue entry is processed, it is remove from the queue and the following sequence is performed; the URL scheme handler is looked up in a registry, such as the platform or BREW platform registry; if a handler is found, the handler application is launched and processes the URL; if a handler is not found, no action is taken and the application is treated as any other expired application; when the handler is launched, it parses the incoming URL to determine its internal behavior, this may include a local action or a server-based or remote action; Local actions may include, but are not limited to, disable (i.e., remove the application binaries), delete (i.e., delete the entire application), etc.; Remote actions include, but are not limited to, install (i.e., install a new application), browse (i.e., "http:// . . . ", etc.)

The present invention includes a program resident in a computer readable medium, where the program directs a wireless device having a computer platform to perform the inventive steps of the method. The computer readable medium can be the memory 56 of the computer platform 50 of the cellular telephone 12, or other wireless device 18, 20, 22, or can be in a local database, such as local database 58 of the cellular telephone 12. Further, the computer readable medium can be in a secondary storage media that is loadable onto a wireless device computer platform, such as a magnetic disk or tape, optical disk, hard disk, flash memory, or other storage media as is known in the art.

The present invention may be implemented, for example, by operating portion(s) of the wireless network 14 to execute a sequence of machine-readable instructions, such as wireless platform 50, the application download server 16, and any other network server 30, 32. The instructions can reside in various types of signal-bearing or data storage primary, secondary, or tertiary media. The media may comprise, for example, RAM (not shown) accessible by, or residing within, the components of the wireless network 14. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A method of operating a client device, comprising:
downloading, to the client device, a software feature, a triggering event parameter associated with a triggering event, and extra data, wherein the triggering event includes deactivation of the software feature on the client device, and wherein the extra data is locally stored on the client device after the downloading and includes a set of actions to be executed and/or a link to a location from which to retrieve the set of actions to be executed;
monitoring, after the downloading, the triggering event parameter;
determining, based on the monitoring, that the triggering event parameter has occurred;
performing, in response to the determining and before processing the triggering event, the set of actions based on the locally stored extra data; and
processing, in response to the determining and after the performing, the triggering event.

2. The method of claim 1, wherein the triggering event parameter is date or time related.

3. The method of claim 1, wherein the triggering event parameter includes a number of uses or accesses to the software feature on the client device.

4. The method of claim 1, wherein the triggering event parameter includes execution of another software feature on the client device.

5. The method of claim 1, wherein the locally stored extra data includes a Uniform Resource Locator (URL).

6. The method of claim 1, wherein the set of actions includes a set of local actions to be performed locally by the client device, a set of remote actions to be implemented by the client device in coordination with a remote system, or a combination thereof.

7. The method of claim 1,
wherein the downloading downloads the software feature, the triggering event parameter, and the extra data from the same entity, or
wherein the downloading downloads the software feature, the triggering event parameter, and the extra data from two or more different entities.

8. A client device, comprising:
a processor means for downloading, to the client device, a software feature, a triggering event parameter associated with a triggering event, and extra data, wherein the triggering event includes deactivation of the software feature on the client device, and wherein the extra data is locally stored on the client device after the downloading and includes a set of actions to be executed and/or a link to a location from which to retrieve the set of actions to be executed;
a processor means for monitoring, after the downloading, the triggering event parameter;
a processor means for determining, based on the monitoring, that the triggering event parameter has occurred;
a processor means for performing, in response to the determination and before processing the triggering event, the set of actions based on the locally stored extra data; and
a processor means for processing, in response to the determination and after the set of actions is performed, the triggering event.

9. The client device of claim 8, wherein the triggering event parameter is date or time related.

10. The client device of claim 8, wherein the triggering event parameter includes a number of uses or accesses to the software feature on the client device.

11. The client device of claim 8, wherein the triggering event parameter includes execution of another software feature on the client device.

12. The client device of claim 8, wherein the locally stored extra data includes a Uniform Resource Locator (URL).

13. The client device of claim 8, wherein the set of actions includes a set of local actions to be performed locally by the client device, a set of remote actions to be implemented by the client device in coordination with a remote system, or a combination thereof.

14. The client device of claim 8,
wherein the processor means for downloading downloads the software feature, the triggering event parameter, and the extra data from the same entity, or
wherein the processor means for downloading downloads the software feature, the triggering event parameter, and the extra data from two or more different entities.

15. A client device, comprising:
at least one processor; and
at least one memory coupled to the at least one processor, the at least one processor and the at least one memory being configured to:
download, to the client device, a software feature, a triggering event parameter associated with a triggering event, and extra data, wherein the triggering event includes deactivation of the software feature on the client device, and wherein the extra data is locally stored on the client device after the downloading and includes a set of actions to be executed and/or a link to a location from which to retrieve the set of actions to be executed;
monitor, after the download, the triggering event parameter;
determine, based on the monitoring, that the triggering event parameter has occurred;
perform, in response to the determination and before processing the triggering event, the set of actions based on the locally stored extra data; and
process, in response to the determination and after the set of actions is performed, the triggering event.

16. The client device of claim 15, wherein the triggering event parameter is date or time related.

17. The client device of claim 15, wherein the triggering event parameter includes a number of uses or accesses to the software feature on the client device.

18. The client device of claim 15, wherein the triggering event parameter includes execution of another software feature on the client device.

19. The client device of claim 15, wherein the locally stored extra data includes a Uniform Resource Locator (URL).

20. The client device of claim 15, wherein the set of actions includes a set of local actions to be performed locally by the client device, a set of remote actions to be implemented by the client device in coordination with a remote system, or a combination thereof.

21. The client device of claim 15,
wherein the at least one processor is configured to download the software feature, the triggering event parameter, and the extra data from the same entity, or wherein the at least one processor is configured to download the software feature, the triggering event parameter, and the extra data from two or more different entities.

22. A non-transitory computer readable medium containing instructions stored thereon, which, when executed on a client device, cause the client device to perform actions, the instructions comprising:

at least one instruction to cause the client device to download, to the client device, a software feature, a triggering event parameter associated with a triggering event, and extra data, wherein the triggering event includes deactivation of the software feature on the client device, and wherein the extra data is locally stored on the client device after the downloading and includes a set of actions to be executed and/or a link to a location from which to retrieve the set of actions to be executed;

at least one instruction to cause the client device to monitor, after the download, the triggering event parameter;

at least one instruction to cause the client device to determine, based on the monitoring, that the triggering event parameter has occurred;

at least one instruction to cause the client device to perform, in response to the determination and before processing the triggering event, the set of actions based on the locally stored extra data; and at least one instruction to cause the client device to process, in response to the determination and after the set of actions is performed, the triggering event.

23. The non-transitory computer readable medium of claim 22, wherein the triggering event parameter is date or time related.

24. The on-transitory computer readable medium of claim 22, wherein the triggering event parameter includes a number of uses or accesses to the software feature on the client device.

25. The non-transitory computer readable medium of claim 22, wherein the triggering event parameter includes execution of another software feature on the client device.

26. The non-transitory computer readable medium of claim 22, wherein the locally stored extra data includes a Uniform Resource Locator (URL).

27. The non-transitory computer readable medium of claim 22, wherein the set of actions includes a set of local actions to be performed locally by the client device, a set of remote actions to be implemented by the client device in coordination with a remote system, or a combination thereof.

28. The non-transitory computer readable medium of claim 22, wherein the at least one instruction to cause the client device to download causes the client device to download the software feature, the triggering event parameter, and the extra data from the same entity, or wherein the at least one instruction to cause the client device to download causes the client device to download the software feature, the triggering event parameter, and the extra data from two or more different entities.

* * * * *